3,058,987
3-AMINO-2-AMINOMETHYL-1-PHENYL-1-PROPANOLS
Harry Allen Albrecht, Nutley, John Thomas Plati, Rutherford, and Wilhelm Wenner, Upper Montclair, N.J., assignors to Hoffmann-La Roche Inc., Nutley, N.J., a corporation of New Jersey
No Drawing. Filed Apr. 6, 1960, Ser. No. 20,281
4 Claims. (Cl. 260—294.7)

This invention relates to derivatives of diamino-isobutanol. More particularly, the invention relates to compounds which are represented by the structural formula

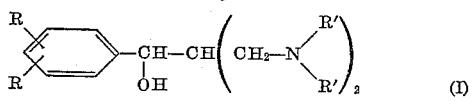
(I)

wherein in the symbols R represent hydrogen, halogen, lower alkyl or lower alkoxy and the symbols R' represent lower alkyl groups or together with the nitrogen form a 5–6 membered saturated nitrogen heterocyclic, and acid addition salts thereof.

In the formula above, either one or both of the symbols R may represent hydrogen or one of the enumerated substituent groups so that either an unsubstituted phenyl group or a phenyl radical bearing one or two substituent groups may be present. All four halogens are included within the meaning of the symbol R. The lower alkyl groups include such groups as methyl, ethyl, propyl, isopropyl, butyl, isobutyl, amyl, isoamyl and the like. The lower alkoxy groups include ether groups containing the same lower alkyl radicals as above.

The group

represents an acyclic or cyclic tertiary amino group. The symbols R' may represent lower alkyl groups such as those described so that a di-lower alkylamino radical is formed. The two symbols R' may also together represent a tetramethylene, pentamethylene or oxytetramethylene group which together with the nitrogen atom forms a 5 or 6 membered saturated nitrogen heterocyclic radical such as pyrrolidyl, piperidyl, morpholinyl and the like.

The compounds of the structural formula set forth above are derived from acetophenone or halogen-, alkyl-, or alkoxy substituted acetophenones. By subjecting the acetophenone to the Mannich reaction one substituted aminomethyl group is introduced. Repetition of the reaction under alkaline conditions effects the introduction of a second aminomethyl group. The resulting ketone is then reduced to the alcohol of Formula I.

The first step of the procedure for forming the products of this invention involves reacting acetophenone or the appropriately substituted acetophenone with about one molar proportion of an amine such as dimethylamine, pyrrolidine, piperidine, or morpholine, or an acid salt thereof, and formaldehyde or paraformaldehyde. By conducting this reaction under acid conditions, e.g. in the presence of added hydrochloric acid, the introduction of one aminomethyl group is favored. Generally a well crystallized material results and a convenient method of purifying the intermediate is thus provided.

A second aminomethyl group is introduced by reacting the intermediate, substituted aminopropiophenone with a second molar proportion of the tertiary amine and formaldehyde or paraformaldehyde, this time under alkaline conditions, e.g. in the presence of sodium hydroxide or excess amine. In this manner a substituted di-aminoisobutyrophenone is obtained.

The substituted di-aminoisobutyrophenone may be reduced to the alcohol, for example, with alkali metal hydrides such as sodium borohydride, preferably in an inert solvent such as alcohol.

The products of Formula I are basic compounds which form acid addition salts by reaction with about one or two molar proportions of inorganic or organic acid. Such acid addition salts as the hydrohalides, e.g. hydrochloride, hydrobromide, hydroiodide, hydrofluoride, other mineral acid salts such as sulfate, nitrate, posphate, and the like, alkyl- and mono-arylsulfonates such as ethanesulfonate, toluenesulfonate, benzenesulfonate, and the like, other organic acid salts such as acetate, tartrate, malate, citrate, benzoate, salicylate, ascorbate, etc., may in this way be obtained.

The compounds of Formula I are useful as diuretics and may be used in treating cardiac conditions such as cardiac edema or in treating hypertension. They may be administered orally by incorporating a therapeutic dosage of the base or a pharmacologically acceptable acid addition salt in a conventional oral dosage form such as tablets, capsules, elixirs, suspensions or the like.

The following examples illustrates the invention. Temperatures are expressed in degrees centigrade.

*Example 1*

Acetophenone (120 g.), dimethylamine hydrochloride (106 g.), paraformaldehyde (39.6 g.), ethanol (160 ml.), and 2 ml. of concentrated hydrochloric acid were refluxed for 2 hours. After the addition of 800 ml. of acetone, the product was allowed to crystallize in the cold, filtered, washed with acetone, and dried on the steam bath to obtain β-dimethylaminopropiophenone hydrochloride, M.P. 153–155°.

β-Dimethylaminopropiophenone hydrochloride (60 g.), 37% formaldehyde solution (22.8 g.), 25% dimethylamine in water (101 g.), and 360 ml. of ethanol were refluxed 1 hour. The solvent was distilled off in vacuo. Water (300 ml.) and excess 50% sodium hydroxide solution were added. The mixture was extracted with 400 ml. of ether. After drying with anhydrous sodium sulfate, the ether was evaporated in vacuo. The residual base was crystallized from 100 ml. of petroleum ether to yield α - dimethylaminomethyl-β-dimethylaminopropiophenone, M.P. 54–56°.

α - Dimethylaminomethyl-β-dimethylaminopropiophenone dihydrochloride, M.P. 164–165°, was obtained in crystalline form by adding a solution of hydrogen chloride in ethanol to an ethanolic solution of the base.

α - Dimethylaminomethyl - β - dimethylaminopropiophenone (26.2 g.) was dissolved in 180 ml. of methanol and added to a solution of sodium borohydride (4.24 g.) in 500 ml. of 50% methanol, below 10°. The addition required 8 minutes. The mixture was stirred for 1 hour while warming to room temperature, and then for 4 hours at 45–50°. Most of the methanol was distilled off in vacuo. With cooling, 150 ml. of water and 30 ml. of 50% sodium hydroxide solution were added. The base was extracted with 2 portions of ether (250 ml. and 150 ml.). After drying over sodium sulfate, the ether was evaporated in vacuo to yield eventually a crystalline residue. On crystallization from 50 ml. of petroleum ether, 3-dimethylamino-2-dimethylaminomethyl - 1 - phenyl-1-propanol, M.P. 63–65°, was obtained.

Addition of a solution of hydrogen chloride in ethanol to 4 g. of crude base obtained above in 10 ml. of ethanol gave the crystalline dihydrochloride, M.P. 225–227°.

*Example 2*

Piperidine hydrochloride (69.3 g.), acetophenone (68.4 g.), paraformaldehyde (25.7 g.) and 170 ml. of ethanol were refluxed for 30 minutes. Then, 34 g. of paraformaldehyde was added, and refluxing continued for 17 hours. On cooling, the product crystallized. It was filtered and washed with cold ethanol to obtain β-(1-piperidyl)propiophenone hydrochloride, M.P. 178–184°.

β-(1-piperidyl)propiophenone hydrochloride (53 g.), piperidine (35.6 g.), 37% formaldehyde solution (25.4 g.), and 300 ml. of ethanol were refluxed for 1 hour. The solvent was distilled off in vacuo. Water (200 ml.) was added, followed by excess 50% sodium hydroxide solution (50 ml.), with cooling. The base was extracted with 300 ml. of benzene, washed with three 100 ml. portions of water, and dried over sodium sulfate. After distillation of the benzene in vacuo, the residue was dissolved in 2 liters of ether and acidified by addition of 180 ml. of a solution of hydrogen chloride in ethanol (about 3 N). 3 - (1-piperidyl)-2-(1-piperidylmethyl)-1-phenyl-1-propanone hydrochloride precipitated as a gum. The ether was decanted and 2500 ml. of hot ethyl acetate was added. After thorough digestion, the mixture was cooled to 30° and filtered to obtain crude dihydrochloride which, on heating, softened at 120° and melted at 143–146°. Crude dihydrochloride recrystallized from a mixture of 30 ml. of ethanol and 60 ml. of ether to give the pure product melting at 155–157°.

The base was liberated from 40 g. of 3-(1-piperidyl)-2-(1-piperidylmethyl) - 1 - phenyl - 1 - propanone dihydrochloride by dissolving in 400 ml. of water and adding excess 50% sodium hydroxide solution. The oily base was isolated by extracting with ether, and evaporating the ether in vacuo. The base was dissolved in 150 ml. of methanol, cooled, and added to a solution of 3.91 g. of sodium borohydride in 200 ml. of 50% methanol below 10°. After stirring in the cold for 5 minutes, the mixture was allowed to warm to room temperature during 1 hour and 50 minutes. The mixture then was maintained at 45–50° for 2½ hours. Crystallization occurred on cooling. The product, 3-(1-piperidyl)-2-(1-piperidylmethyl)-1-phenyl-1-propanol, was filtered and washed with cold 50% methanol, M.P. 84–86°.

The base obtained above (3 g.) was dissolved in 100 ml. of dry ether, and dry hydrogen bromide was passed in to precipitate the solid salt. On crystallization from ethanol, pure 3-(1-piperidyl)-2-(1-piperidylmethyl)-1-phenyl-1-propanol dihydrobromide, M.P. 140–144°, was obtained.

*Example 3*

4'-chloroacetophenone (46.2 g.), piperidine hydrochloride (36.4 g.), paraformaldehyde (13.5 g.), ethanol (60 ml.) and 1 ml. of concentrated hydrochloric acid were refluxed for 2 hours. On cooling, crystalline β-(1-piperidyl)-p-chloropropiophenone hydrochloride, M.P. 191–192°, was obtained.

β - (1-piperidyl)-p-chloropropiophenone hydrochloride (39.3 g.), piperidine (23.3 g.), 37% formaldehyde solution (16.7 g.), and 200 ml. of ethanol were refluxed for 1 hour. The solvent was distilled off in vacuo. With cooling, 200 ml. of water and 40 ml. of 50% sodium hydroxide solution were added. The mixture was extracted with 2 portions of ether (200 ml. and 100 ml.). The combined ether extracts were dried over sodium sulfate. The ether was evaporated in vacuo, and the residue was crystallized from a mixture of 120 ml. of methanol and 10 ml. of water, to obtain 3-(1-piperidyl)-2-(1-piperidylmethyl)-1-(4-chlorophenyl)-1-propanone, M.P. 71–72.5°.

Sodium borohydride (2.27 g.) was dissolved in 40 ml. of 50% methanol below 10°. 3-(1-piperidyl)-2-(1-piperidylmethyl) - 1 - (4-chlorophenyl)-1-propanone (20.9 g.) was dissolved in 150 ml. of methanol and added with continued cooling below 10°. After 5 minutes of stirring in the cold, the ice bath was removed. After another 45 minutes, the mixture was warmed at 45–50° for 45 minutes. On cooling, the product, 3-(1-piperidyl)-2-(1-piperidylmethyl)-1-(4-chlorophenyl)-1-propanol, M.P. 84–87°, was obtained.

10 g. of the base obtained above was dissolved in 25 ml. of ethanol and a solution of hydrogen chloride in ethanol was added. On dilution with 125 ml. of ether, 3-(1-piperidyl)-2-(1-piperidylmethyl)-1-(4 - chlorophenyl) - 1 - propanol dihydrochloride, M.P. 243–245°, was obtained.

*Example 4* p-Methoxyacetophenone (500 g.), piperidine hydrochloride (405 g.), paraformaldehyde (150 g.), 650 ml. of ethanol, and 10 ml. of concentrated hydrochloric acid were refluxed for 2 hours. The product was allowed to crystallize at room temperature for 2 hours and then at the temperature of an ice bath. After filtering, washing with two 100 ml. portions of cold ethanol, and drying on a steam bath, the product, β-(1-piperidyl)-p-methoxypropiophenone hydrochloride, M.P. 210–212°, was obtained.

β - (1-piperidyl)-p-methoxypropiophenone hydrochloride (681 g.), 37% formaldehyde solution (292 g.), 95% piperidine (430 g.), and 2 liters of ethanol were refluxed for 1 hour. Most of the solvent was distilled off in vacuo while maintaining the inside temperature below 60°. The residue was cooled, and 2 liters of water and 300 ml. of 50% sodium hydroxide solution were added. The mixture was extracted with 2 portions of ether (800 ml. and 500 ml.). The combined ether extracts were dried over sodium sulfate. The ether was then distilled off in vacuo without heating the residue above 60°. The residue was dissolved in 1100 ml. of petroleum ether, and allowed to crystallize at 0°. The product, 3-(1-piperidyl)-2-(1-piperidylmethyl)-1-(4-methoxyphenyl)-1-propanone, was filtered and dried in the air, M.P. 54–57°.

With stirring and cooling below 10°, 50 g. of sodium borohydride was added to 400 ml. of methanol and 100 ml. of water. A cold solution of 455 g. of 3-(1-piperidyl)-2 - (1 - piperidylmethyl) - 1 - (4 - methoxyphenyl)-1-propanone in 1 liter of methanol was then added over a 25 minute period, with cooling below 10°. After an additional 5 minutes of stirring in the cold, the ice bath was removed, and stirring was continued with no further cooling. After 1 hour and 20 minutes, the reaction temperature rose to 33°. Then, the mixture was warmed at 45–50° for 2 hours. On cooling in an ice bath, the crystalline base, 3-(1-piperidyl)-2-(1-piperidylmethyl)-1-(4-methoxyphenyl)-1-propanol, was obtained. It was filtered, washed with dilute methanol, and dried in vacuo over potassium hydroxide, M.P. 88–91°.

263 g. of the base obtained above was dissolved in 1300 ml. of ethanol, and the solution was acidified by the addition of a solution of hydrogen chloride in ethanol (500 ml. of 3.33 N) with cooling below 25°. The dihydrochloride was allowed to crystallize at room temperature for several hours. After filtering, washing with two 100 ml. portions of cold ethanol, and drying in vacuo over potassium hydroxide, 3-(1-piperidyl)-2-(1-piperidylmethyl)-1-(p-methoxyphenyl)-1-propanol dihydrochloride, M.P. 228–230°, was obtained. The melting point was found to vary slightly according to the rate of heating.

*Example 5*

4-acetylveratrole (60 g.), piperidine hydrochloride (40.6 g), paraformaldehyde (15 g.), 60 ml. of ethanol, and 1 ml. of concentrated hydrochloric acid were refluxed for 2 hours. The solution was filtered hot and allowed to crystallize in the cold. The product was filtered, washed with three 10 ml. portions of cold ethanol, and dried in vacuo over potassium hydroxide to obtain 3-(1-piperidyl)-1-(3,4-dimethoxyphenyl) - 1 - propanone hydrochloride, M.P. 180–182°.

3 - (1 - piperidyl) - 1 - (3,4 - dimethoxyphenyl) - 1 - propanone hydrochloride (10 g.), 37% formaldehyde solution (3.88 g.), 95% piperidine (5.70 g), and 50 ml. of ethanol were refluxed for 1 hour. The solvent was distilled off in vacuo. Water (50 ml.) and excess 50% sodium hydroxide solution (10 ml.) were added with cooling. The base was extracted with 2 portions of ether (50 ml. and 30 ml.). The combined ether extracts were dried over sodium sulfate, and concentrated in vacuo. The residue was redissolved in 130 ml. of ether, and a solution of hydrogen chloride in ethanol was added to precipitate the solid 3-(1-piperidyl)-2-(1-piperidylmethyl)-1-(3,4-dimethoxyphenyl)-1-propanone dihydrochloride, melting at 175–177°. The mixed melting point with the starting material was depressed. On recrystallization from ethanol, the melting point rose to 183–185°.

3 - (1 - piperidyl) - 2 - (1 - piperidylmethyl) - 1 - (3,4-dimethoxyphenyl)-1-propanone dihydrochloride (9.7 g.) was dissolved in 80 ml. of water, and 5 ml. of 50% sodium hydroxide solution were added. The base was extracted with 100 ml. of ether. The ether was evaporated in vacuo. The residual base was dissolved in 30 ml. of methanol and added below 10° to a solution of 0.82 g. of sodium borohydride in 20 ml. of 50% methanol. The mixture was allowed to warm to room temperature during 1 hour, and then warmed at 45–50° for 2 hours and 25 minutes. Most of the solvent was distilled off in vacuo. Water (50 ml.) was added, and the mixture was extracted with ether (50 ml.). After drying with sodium sulfate, the ether was evaporated in vacuo to leave 3-(1-piperidyl)-2 - (1 - piperidylmethyl) - 1 - (3,4 - dimethoxyphenyl) - 1-propanol as a crude residue.

The residue was dissolved in 20 ml. of ethanol, and acidified by addition of a solution of hydrogen chloride in ethanol. The 3-(1-piperidyl)-2-(1-piperidylmethyl)-1-(3,4-dimethoxyphenyl)-1-propanol dihydrochloride, which crystallized at room temperature, was filtered, washed with ethanol, and dried in vacuo over potassium hydroxide, M.P. 172–179°. The dihydrochloride was solvated, and the melting point did not improve on recrystallization.

The free base was obtained again by dissolving the dihydrochloride (1 g.) in 20 ml. of water. Excess 10% sodium hydroxide solution was added, and the base was extracted with 30 ml. of ether. The ether was dried over sodium sulfate, and evaporated in vacuo. The residual oil was crystallized from 3 ml. of petroleum ether to yield the base, M.P. 64–66°.

*Example 6*

Acetophenone (40 g.), morpholine hydrochloride (41.2 g.), paraformaldehyde (15 g.), 60 ml. of ethanol and 1 ml. of concentrated hydrochloric acid were refluxed for 2 hours. The product, β-(4-morpholinyl)propiophenone hydrochloride, crystallized on cooling, M.P. 176–178°.

β-(4-morpholinyl)propiophenone hydrochloride (59.8 g.), 37% formaldehyde solution (28.5 g.), morpholine (40.7 g.) and 250 ml. of ethanol were refluxed for 1 hour. The solvent was distilled off in vacuo. With cooling, 300 ml. of water and 40 ml. of 50% sodium hydroxide solution were added. The mixture was extracted with 2 portions of ether (200 ml. and 100 ml.). The combined ether extracts were washed with 200 ml. of water, dried with sodium sulfate, and evaporated in vacuo to leave a residual oil.

This crude base was dissolved in 300 ml. of ethanol, and acidified by the addition of a solution of hydrogen chloride in ethanol. The crystalline product was filtered, washed with ethanol and dried in vacuo over potassium hydroxide to obtain 3-(4-morpholinyl)-2-(4-morpholinylmethyl)-1-phenyl-1-propanone dihydrochloride, M.P. 147–148°.

3-(4-morpholinyl)-2-(4-morpholinylmethyl - 1-phenyl-1-propanone (50 g.) was dissolved in 300 ml. of water. Excess 50% sodium hydroxide solution was added, the base was extracted with 300 ml. of ether, and the ether was evaporated in vacuo. The residue was dissolved in 150 ml. of methanol, and the solution was added below 10° to 4.84 g. of sodium borohydride in 40 ml. of methanol plus 10 ml. of water. The reaction was allowed to warm to 35°. After 1½ hours, the reaction subsided, and the temperature of the mixture was maintained at 45–50° for 2¼ hours. Most of the solvent was distilled off in vacuo, water (150 ml.) was added, and the oily base was extracted with ether (150 ml.). After drying over sodium sulfate, the ether solution was concentrated in vacuo and the residue was crystallized from 100 ml. of methanol plus 100 ml. of water to yield 3-(4-morpholinyl)-2-(4-morpholinylmethyl)-1-phenyl - 1 - propanol, M.P. 98–101°.

A solution of 20 g. of the base in 100 ml. of ethanol was acidified by the addition of a solution of hydrogen chloride in ethanol. The crystalline dihydrochloride melted at 237–238°.

*Example 7* o-Methoxyacetophenone (45 g.), piperidine hydrochloride (36.5 g.), paraformaldehyde (13.5 g.), 60 ml. of ethanol, and 1 ml. of concentrated hydrochloric acid were refluxed for 2 hours. After several days of standing in the refrigerator, the crystalline product was obtained. It was filtered, washed with ethanol and dried in vacuo over potassium hydroxide to obtain β - (1-piperidyl)-o-methoxypropiophenone hydrochloride, M.P. 147–149°.

β-(1-piperidyl)-o-methoxypropiophenone hydrochloride (40 g.), 37% formaldehyde solution (17.2 g.), 95% piperidine (25.2 g.), and 200 ml. of ethanol were refluxed for 1 hour. The solvent was distilled off in vacuo. With cooling, 200 ml. of water and 40 ml. of 50% sodium hydroxide solution were added, and the base was extracted with ether (250 ml.). The ether solution was dried over sodium sulfate, and evaporated in vacuo. The crude base thus obtained, 3-(1-piperidyl)-2-(1-piperidylmethyl)-1-(2-methoxyphenyl) - 1 - propanone, was dissolved in 1 liter of dry ether, and hydrogen chloride gas was passed in to precipitate the solid dihydrochloride. The crude dihydrochloride was extremely hydroscopic, and was purified by dissolving it in 200 ml. of ethanol and adding 500 ml. of ether, to obtain crystalline 3-(1-piperidyl)-2-(1-piperidylmethyl)-1 - (2-methoxyphenyl)-1-propanone dihydrochloride, M.P. 138–140°.

3-(1-piperidyl)-2-(1-piperidylmethyl) - 1 - (2-methoxyphenyl)-1-propanone dihydrochloride (20 g.) was dissolved in water, excess 50% sodium hydroxide solution was added, and the base was extracted with ether. The ether solution was evaporated in vacuo, the residual base was dissolved in 50 ml. of methanol, and the solution added below 10° to 1.81 g. of sodium borohydride in 40 ml. of methanol plus 10 ml. of water. The mixture was stirred at room temperature for 1 hour and then for 2¼ hours at 45–50°. The mixture was concentrated by distilling off part of the solvent in vacuo, whereupon crystallization occurred. The base, 3-(1-piperidyl) - 2 - (1 - piperidylmethyl)-1-(2-methoxyphenyl)-1 - propanol, was allowed to crystallize in the cold, filtered, washed with 50% methanol, and dried in vacuo over potassium hydroxide to obtain the pure product, M.P. 88–91°.

The free base obtained above was dissolved in ethanol (30 ml.), and the solution was acidified by the addition of a solution of hydrogen chloride in ethanol. On standing, crystalline 3-(1-piperidyl)-2-(1-piperidylmethyl)-1-(2-methoxyphenyl)-1 - propanol dihydrochloride, M.P. 138–151°, was obtained.

*Example 8* m-Methoxyacetophenone (25 g.), piperidine hydrochloride (20.3 g.), paraformaldehyde (7.5 g.), 35 ml. of ethanol and 0.5 ml. of concentrated hydrochloric acid were refluxed for 2 hours. On cooling, crystalline β-(1-piperidyl)-m-methoxypropiophenone hydrochloride, M.P. 135–144°, was obtained. Recrystallization from 110 ml. of ethanol gave the pure material, M.P. 154°.

β-(1-piperidyl)-m-methoxypropiophenone hydrochloride (18.5 g.), 95% piperidine (11.7 g.), 37% formaldehyde solution (7.92 g.) and 90 ml. of ethanol were refluxed for 1 hour. The solvent was distilled off in vacuo. With cooling, 100 ml. of water and 20 ml. of 50% sodium hydroxide solution were added. The mixture was extracted with 120 ml. of ether, the ether extract dried over anhydrous sodium sulfate, and the ether evaporated in vacuo. The crude base, 3-(1-piperidyl)-2-(1-piperidylmethyl)-1-(3-methoxyphenyl)-1-propanone, was dissolved in 30 ml. of ethanol and acidified by the addition of a solution of hydrogen chloride in ethanol. On addition of 100 ml. of ether, the crystalline dihydrochloride, M.P. 155–157°, was obtained.

The base was obtained from 12.5 g. of 3-(1-piperidyl)-2-(1-piperidylmethyl)-1-(3-methoxyphenyl) - 1 - propanone dihydrochloride by dissolving it in water (100 ml.), adding excess 50% sodium hydroxide solution, extracting with 2 portions of ether (80 ml. and 40 ml.), and evaporating the ether in vacuo. The base was dissolved in 50 ml. of methanol and added below 10° to 1.14 g. of sodium borohydride in 40 ml. of methanol and 10 ml. of water. The mixture was allowed to warm to room temperature with stirring during 1 hour, and then warmed at 45–50° for 2¼ hours. Most of the solvent was distilled off in vacuo. Water (50 ml.) was added to the residue, and the base was extracted with ether (250 ml.). On evaporating the ether in vacuo, the solid base, 3-(1-piperidyl)-2-(1-piperidylmethyl)-1-(3 - methoxyphenyl)-1-propanol, M.P. 103–105°, was obtained. Recrystallization from methanol gave a product melting at 105–106.5°.

A solution of 8 g. of the free base obtained above in 20 ml. of ethanol was acidified by addition of a solution of hydrogen chloride in ethanol. On addition of 40 ml. of ether, the crystalline dihydrochloride was obtained. The dihydrochloride was solvated, and the melting point depended upon the rate of heating. A sample, heated very slowly in the apparatus, melted at 208–212°, after slight preliminary shrinking.

Example 9

Methyl p-tolyl ketone (40.2 g.), piperidine hydrochloride (36.5 g.), paraformaldehyde (13.5 g.), 60 ml. of ethanol, and 1 ml. of concentrated hydrochloric acid were refluxed for 2 hours. On cooling, crystalline 3-(1-piperidyl)-1-(p-tolyl)-1-propanone hydrochloride, M.P. 172.5–174.5°, was obtained.

3-(1-piperidyl)-1-(p-tolyl)-1-propanone hydrochloride (45 g.), 95% piperidine (30.1 g.), 37% formaldehyde solution (20.4 g.), and 200 ml. of ethanol were refluxed for 1 hour. The solvent was distilled off in vacuo. With cooling, 200 ml. of water and 40 ml. of 50% sodium hydroxide solution were added, and the base was extracted with 2 portions of ether (150 ml. and 75 ml.). The combined ether extracts were dried over sodium sulfate and evaporated in vacuo. The solid residue was crystallized from a mixture of 125 ml. of methanol and 34 ml. of water to give practically pure 3-(1-piperidyl)-2-(1-piperidylmethyl)-1-(p-tolyl)-1-propanone, M.P. 70–72°.

3 - (1 - piperidyl) - 2 - (1 - piperidylmethyl) -1 - (p-tolyl)-1-propanone (20 g.) was dissolved in 80 ml. of methanol, and the solution was added below 10° to a solution of 2.30 g. of sodium borohydride, 40 ml. of methanol, and 10 ml. of water during 20 minutes. After an additional five minutes in the cold, the mixture was allowed to warm with stirring to room temperature during 1 hour. The temperature reached 32° before the reaction subsided. The mixture was warmed for 2 hours at 45–50°. Upon the addition of 18 ml. of water and cooling, the crystalline base, 3-(1-piperidyl)-2-(1-piperidylmethyl)-1-(p-tolyl)-1-propanol, M.P. 68–71°, was obtained.

The base (12.3 g.) in ethanol (25 ml.) was acidified by the addition of a solution of hydrogen chloride in ethanol (35 ml. of approximately 3 N). Ether (200 ml.) was added to give the crystalline dihydrochloride, M.P. 237–239°.

Example 10 m-Chloroacetophenone (26.5 g.), piperidine hydrochloride (20.8 g.), paraformaldehyde (7.7 g.), ethanol (35 ml.), and 0.6 ml. of concentrated hydrochloric acid were refluxed for 2 hours. On cooling, crystalline β-(1-piperidyl)-m-chloropropiophenone hydrochloride, M.P. 180–182°, was obtained.

β-(1-piperidyl)-m-chloropropiophenone hydrochloride (25.2 g.), 95% piperidine (15.7 g.), 37% formaldehyde solution (10.7 g.) and 125 ml. of ethanol were refluxed for 1 hour. The solvent was distilled off in vacuo. With cooling, 125 ml. of water and 20 ml. of 50% sodium hydroxide solution were added. The mixture was extracted with 150 ml. of ether. The ether extract was dried over sodium sulfate and evaporated in vacuo to obtain the crude product, 3 - (1 - piperidyl) - 2 - (1 - piperidylmethyl) - 1 - (3-chlorophenyl)-1-propanone, which was reduced directly with sodium borohydride.

Sodium borohydride (3.3 g.) was dissolved in 50 ml. of methanol plus 15 ml. of water, below 10°. A cold solution of the crude ketone obtained as described above in 200 ml. of methanol was added below 10°, over a 15 minute period. The mixture was stirred for 1 hour while warming to room temperature and 20 minutes at 50°. On cooling, 16.9 g. of crystalline 3-(1-piperidyl)-2-(1-piperidylmethyl) - 1 - (3 - chlorophenyl) - 1 - propanol, M.P. 96–99°, was obtained.

The base (10 g.) was dissolved in 30 ml. of ethanol, and a solution of hydrogen chloride in ethanol was added. The 3-(1-piperidyl)-2-(1-piperidylmethyl) - 1 - (3-chlorophenyl)-1-propanol dihydrochloride which crystallized melted at 165–166°.

Example 11

Hydrogen chloride gas was passed into a solution of 39.3 g. of pyrrolidine in 100 ml. of ethanol, until the mixture was just slightly acidic. Then, 83 g. of p-methoxyacetophenone, 24.9 g. of paraformaldehyde, and 1 ml. of concentrated hydrochloric acid were added. The mixture was refluxed for 2 hours. On cooling, crystalline β-(1-pyrrolidyl)-p-methoxypropiophenone hydrochloride was obtained, melting at 180–182°.

β-(1-pyrrolidyl)-p-methoxypropiophenone hydrochloride (45 g.), pyrrolidine (24 g.), 37% formaldehyde solution (20 g.), and 20 ml. of ethanol were refluxed for 1 hour. The solvent was distilled off in vacuo. With cooling, 200 ml. of water and 40 ml. of 50% sodium hydroxide solution were added to the residue. The base solidified, was crushed, filtered, and washed with water. Without drying, the crude base was dissolved in 125 ml. of methanol at room temperature, and water (85 ml.) added to slight turbidity. On cooling, crystalline 3-(1-pyrrolidyl)-2 - (1 - pyrrolidylmethyl) - 1 - (4 - methoxyphenyl) - 1-propanone, melting at 86–88°, was obtained.

Sodium borohydride (2.40 g.) was dissolved in 40 ml. of methanol and 10 ml. of water below 10°. A solution of 20 g. of 3-(1-pyrrolidyl)-2-(1-pyrrolidylmethyl)-1-(4-methoxyphenyl)-1-propanone in 80 ml. of methanol was added at 5–10° over a 15 minute period. The mixture was stirred for 5 minutes in the cold, for one hour while warming to room temperature, and for 2 hours and 20 minutes at 45–50°. The solvent was distilled off in vacuo. Petroleum ether (100 ml.) and 10 ml. of water were added to the residue. The petroleum ether was evaporated in vacuo to leave a viscous, partly crystalline residue, 3 - (1 - pyrrolidyl) - 2 - (1 - pyrrolidylmethyl)-1-(4-methoxyphenyl)-1-propanol.

The crude base obtained as described above was dissolved in 200 ml. of ether. A solution of hydrogen chloride in ethanol was added. After settling in the cold, the supernatant liquid was decanted, and the gum crystallized from 50 ml. of isopropanol to obtain 3-(1-pyrrolidyl)-2-(1 - pyrrolidylmethyl) - 1 - (4 - methoxyphenyl) - 1 - propanol dihydrochloride melting at 191–194°. Recrystallization raised the melting point to 199–201°.

Example 12 p-Methoxyacetophenone (50 g.), dimethylamine hydrochloride (35.3 g.), paraformaldehyde (15 g.), 70 ml. of ethanol and 0.7 ml. of concentrated hydrochloric acid were refluxed for 2 hours. While cooling, 200 ml. of acetone were added. The crystalline product, β-dimethylamino-p-methoxypropiophenone hydrochloride, M.P. 182–184°, was separated by filtration.

β-Dimethylamino - p - methoxypropiophenone hydrochloride (68 g.), 25% dimethylamine in water (101 g.), 37% formaldehyde solution (34 g.) and 300 ml. of ethanol were refluxed for one hour. The solvent was evaporated in vacuo. The residue was chilled and 300 ml. of water and 40 ml. of 50% sodium hydroxide solution were added below 20°. The mixture was extracted twice with ether (250 ml., of 100 ml.), the ether extracts were combined and dried over sodium sulfate. The ether was then evaporated in vacuo and the crude residue was crystallized from 210 ml. of petroleum ether. The 3-dimethylamino-2-dimethylaminomethyl-1-(4-methoxyphenyl)-1-propanone melted at 54–61°.

Sodium borohydride (6.87 g.) was dissolved in 20 ml. of water and 60 ml. of methanol below 10°. 3-dimethylamino-2 - dimethylaminomethyl-1 - (4-methoxyphenyl)-1-propanone (48 g.) was dissolved in 100 ml. of methanol and added to the sodium borohydride solution over a 10 minute period below 10°. The mixture was stirred while cold for 10 minutes, then 1 hour and 15 minutes at room temperature and 2½ hours at 45–50°. The solvent was distilled in vacuo. 200 ml. of water were added to the residue. This was extracted with 200 ml. of ether and the ether extracted was dried over sodium sulfate. Then the solvent was evaporated in vacuo. The residue was dissolved in 200 ml. of ethanol and acidified with a solution of hydrogen chloride in ethanol. 3-dimethylamino - 2 - dimethylaminomethyl-1-(4-methoxyphenyl) - 1-propanol dihydrochloride crystallized. The product was recrystallized from ethanol, M.P. 226.5–227°.

We claim:

1. A compound selected from the group consisting of bases represented by the formula

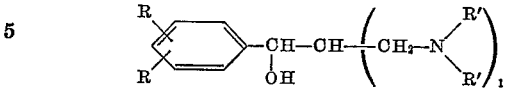

wherein R represents a member of the group consisting of hydrogen, halogen, lower alkyl and lower alkoxy, and the symbols R' represent a member of the group consisting of lower alkyl individually, and collectively, together with the nitrogen atom, pyrrolidyl, piperidyl, and morpholinyl and pharmacologically acceptable acid addition salts thereof.

2. A compound represented by the formula

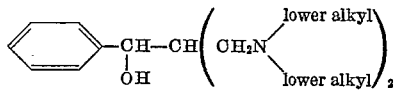

3. A compound represented by the formula

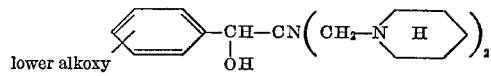

4. 3 - (1 - piperidyl - 2 - (1 - piperidylmethyl) - 1 - (4-methoxyphenyl)-1-propanol.

References Cited in the file of this patent

UNITED STATES PATENTS

| | | |
|---|---|---|
| 2,514,380 | Duschinsky | July 11, 1950 |
| 2,835,676 | Sprague et al. | May 20, 1958 |
| 2,962,501 | Cutler et al. | Nov. 29, 1960 |

OTHER REFERENCES

Cardwell: Journal of the Chemical Society, 1950, page 1061.

Williams et al.: Journal of the American Chemical Society, vol. 74, 3875 and 3876 (1952).

Hach et al.: Chemical Abstracts, vol. 51, page 10403h (1957).

UNITED STATES PATENT OFFICE
CERTIFICATE OF CORRECTION

Patent No. 3,058,987                                    October 16, 1962

Harry Allen Albrecht et al.

It is hereby certified that error appears in the above numbered patent requiring correction and that the said Letters Patent should read as corrected below.

Column 2, line 10, for "posphate" read -- phosphate --; column 6, line 38, for "hydroscopic" read -- hygroscopic --; column 9, line 16, strike out "of"; column 10, lines 4 to 7, the right-hand portion of the formula should appear as shown below instead of as in the patent:

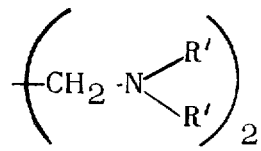

lines 22 to 24, the center portion of the formula should appear as shown below instead of as in the patent:

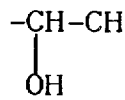

same column 10, under the heading "UNITED STATES PATENTS" add the following:

2,934,534     Morren ------ Apr. 26, 1960 same column 10, above "OTHER REFERENCES" insert:

FOREIGN PATENTS 840,496     Great Britain ----- July 6, 1960

Signed and sealed this 21st day of May 1963.

(SEAL)
Attest:

ERNEST W. SWIDER                                    DAVID L. LADD
Attesting Officer                                     Commissioner of Patents